(12) United States Patent
Liu et al.

(10) Patent No.: US 8,061,857 B2
(45) Date of Patent: Nov. 22, 2011

(54) LED LIGHT SHAPING DEVICE AND ILLUMINATION SYSTEM

(75) Inventors: Ying Liu, Hong Kong (CN); Shou-Lung Chen, Hong Kong (CN)

(73) Assignee: Hong Kong Applied Science and Technology Research Institute Co. Ltd., Hong Kong (CN)

( * ) Notice: Subject to any disclaimer, the term of this patent is extended or adjusted under 35 U.S.C. 154(b) by 474 days.

(21) Appl. No.: 12/275,594

(22) Filed: Nov. 21, 2008

(65) Prior Publication Data
US 2010/0128233 A1    May 27, 2010

(51) Int. Cl.
G03B 21/20 (2006.01)
G03B 21/28 (2006.01)
F21V 5/00 (2006.01)
F21V 7/00 (2006.01)

(52) U.S. Cl. ............ 353/102; 353/98; 353/99; 362/328; 362/331; 362/346

(58) Field of Classification Search .................. 353/102, 353/98, 99; 362/327, 328, 341, 346, 326, 362/331
See application file for complete search history.

(56) References Cited

U.S. PATENT DOCUMENTS

| | | | | |
|---|---|---|---|---|
| 2,254,962 | A * | 9/1941 | Bitner et al. ................. | 362/327 |
| 4,767,172 | A | 8/1988 | Nichols et al. | |
| 5,757,557 | A * | 5/1998 | Medvedev et al. ............ | 359/708 |
| 6,547,423 | B2 * | 4/2003 | Marshall et al. .............. | 362/333 |
| 6,664,814 | B1 | 12/2003 | Evans et al. | |
| 6,819,505 | B1 * | 11/2004 | Cassarly et al. .............. | 359/726 |
| 6,902,291 | B2 * | 6/2005 | Rizkin et al. ................ | 362/153.1 |
| 6,974,234 | B2 * | 12/2005 | Galli ............................. | 362/294 |
| 7,401,948 | B2 * | 7/2008 | Chinniah et al. ............. | 362/326 |
| 7,411,742 | B1 | 8/2008 | Kim et al. | |
| 7,744,246 | B2 * | 6/2010 | Rizkin et al. ................. | 362/245 |
| 2002/0080615 | A1 | 6/2002 | Marshall et al. | |
| 2005/0135109 | A1 | 6/2005 | Stout | |
| 2008/0137042 | A1 * | 6/2008 | Alasaarela .................... | 353/102 |

FOREIGN PATENT DOCUMENTS

| | | |
|---|---|---|
| CN | 2883909 | 3/2007 |
| CN | 101105272 A | 1/2008 |
| CN | 101109488 A | 1/2008 |
| CN | 101210657 A | 7/2008 |
| CN | 101262034 A | 9/2008 |

OTHER PUBLICATIONS

International Search Report and Written Opinion issued in International Application No. PCT/CN2008/073527, dated Jul. 30, 2009.

* cited by examiner

*Primary Examiner* — Georgia Y Epps
*Assistant Examiner* — Magda Cruz
(74) *Attorney, Agent, or Firm* — Venable LLP; Jeffri A. Kaminski; Todd R. Farnsworth (57) ABSTRACT

An LED light shaping device and illumination system are provided. According to one embodiment, a light shaping lens is configured to shape light emitted from a light source and direct the light on a display panel for projection. The light shaping lens comprises a light input surface configured to receive light emitted from the light source a reflective surface configured to reflect at least part of the light received by the light source; and a light output surface having a first curvature in a first direction and a second curvature in a second direction, wherein the light output surface is configured to emit the light that is received by the light input surface and reflected by the reflective surface, and wherein the first curvature and the second curvature are configured to shape the light such that the emitted light has an oval cross section.

25 Claims, 7 Drawing Sheets

LED LIGHT SHAPING DEVICE AND ILLUMINATION SYSTEM

FIELD OF THE INVENTION

The present invention relates to an LED light shaping device and illumination system, and more particularly, to a light shaping lens for use with projection illumination systems.

BACKGROUND OF THE INVENTION

Advances in high-brightness light emitting diodes (LED) have created opportunities for the use of LED in different lighting technologies, including small mobile data projectors. Light from the LED is projected onto a micro-display, such as a liquid crystal display (LCD), liquid crystal on silicon (LCoS) or digital micro-mirror device (DMD). One challenge of the micro projector technology is that the micro-displays generally have a rectangular shape, and LED emit light in a rounded, hemisphere shape, which does not conform to the shape of the micro-display. Accordingly, since the shape of the light emitted from the LED does not conform to the shape of micro-display devices, the efficiency and uniformity of the LED light and the projected image is poor. Some approaches have attempted to address this problem. However, some of these known approaches require multiple lenses and thereby increase the size of the projection system, resulting in substantially larger projection devices.

Therefore, existing LED light shaping systems have these and other limitations. Accordingly, there is a need for an LED light shaping device and illumination system that solves these and other shortcomings.

SUMMARY OF THE INVENTION

According to one embodiment of the present invention, a light shaping lens configured to shape light emitted from a light source is disclosed. The light shaping lens includes a light input surface configured to receive light emitted from the light source; a reflective surface configured to reflect at least part of the light received by the light input surface; and a light output surface having a first curvature in a first direction and a second curvature in a second direction, wherein the light output surface is configured to emit the light that is received from the light input surface and reflected by the reflective surface, and wherein the first curvature and the second curvature are configured to shape the light emitted from the light output surface such that the light emitted from the light output surface has an oval cross section.

According to another embodiment of the present invention, a light shaping lens configured to shape light emitted from a light source is disclosed. The light shaping lens includes a first refractive lens surface configured to receive a first part of the light emitted from the light source; a second refractive lens surface configured to receive a second part of the light emitted from the light source; a reflective lens surface configured to reflect at least part of light received by the first refractive lens surface and the second refractive lens surface; and a third refractive lens surface configured to emit the light the light received from the first refractive lens surface and the second refractive lens surface and reflected by the reflective lens surface, the third refractive lens surface having a first curvature and a second curvature, and wherein the third refractive lens surface refracts the emitted light in an oval cross section.

According to another embodiment of the present invention, an illumination system is disclosed. The illumination system includes a light source configured to emit light; a display panel; a light shaping lens having a light input surface configured to receive light emitted from the light source; a reflective surface configured to reflect at least part of the light received by the light input surface; a light output surface having a first curvature in a first direction and a second curvature in a second direction, wherein the light output surface is configured to emit the light that is received by the light input surface and reflected by the reflective surface, and wherein the first curvature and the second curvature are configured to shape the light emitted from the light output surface such that the light emitted from the light output surface has an oval cross section, and wherein the light shaping lens is positioned to direct the light emitted from the output surface on the display panel.

According to another embodiment of the present invention, a projection system is disclosed. The projection system includes a light source configured to emit light; a display panel; a light shaping lens having a light input surface configured to receive light emitted from the light source; a reflective surface configured to reflect part of the light received by the light input surface; a light output surface having a first curvature in a first direction and a second curvature in a second direction, wherein the light output surface is configured to emit the light that is received by the light input surface and reflected by the reflective surface, and wherein the first curvature and the second curvature are configured to shape the light emitted from the output surface such that the light emitted from the light output surface has an oval cross section, and wherein the light shaping lens is positioned to direct the emitted light on the display panel; and a projection lens group that receives the light emitted from the output surface, modulated by display panel, the projection lens group configured to project the modulated image.

Still other embodiments of the present invention will become readily apparent to those skilled in the art from the following detailed description, wherein embodiments of the invention are described by way of illustration. As will be realized, the invention is capable of other and different embodiments and its several details are capable of modifications in various respects, all without departing from the spirit and the scope of the present invention.

DETAILED DESCRIPTION

In the following description, reference is made to the accompanying drawings where, by way of illustration, specific embodiments of the invention are shown. It is to be understood that other embodiments may be used as structural and other changes may be made without departing from the scope of the present invention. Also, the various embodiments and aspects from each of the various embodiments may be used in any suitable combinations. Accordingly, the drawings and detailed description are to be regarded as illustrative in nature and not as restrictive.

Generally, embodiments of the present invention are directed to a light shaping lens and an illumination system and a projection apparatus incorporating the LED light shaping lens. According to one example embodiment, the light shaping lens emits light from a lens output surface. The output surface includes two different curvatures, having a first curvature radius in a first direction and a second curvature radius in a second direction. The first direction and the second direction are generally perpendicular to each other. The two different curvatures act upon light to shape the light into a beam having a generally oval or ellipse shape. According to one embodiment, the lens output surface has a free-form shape. Since conventional projector display panels have a generally rectangular shape, such as having a ratio of 16:9 or 4:3, for example, emitted light having an oval cross section allows the light to be focused on the area of the display panel, which results in greater uniformity and enhanced efficiency. One advantage of embodiments of the present invention is that a single lens may be used for light shaping purposes, which may result in a smaller projector and a shorter optical system.

Figure 1:
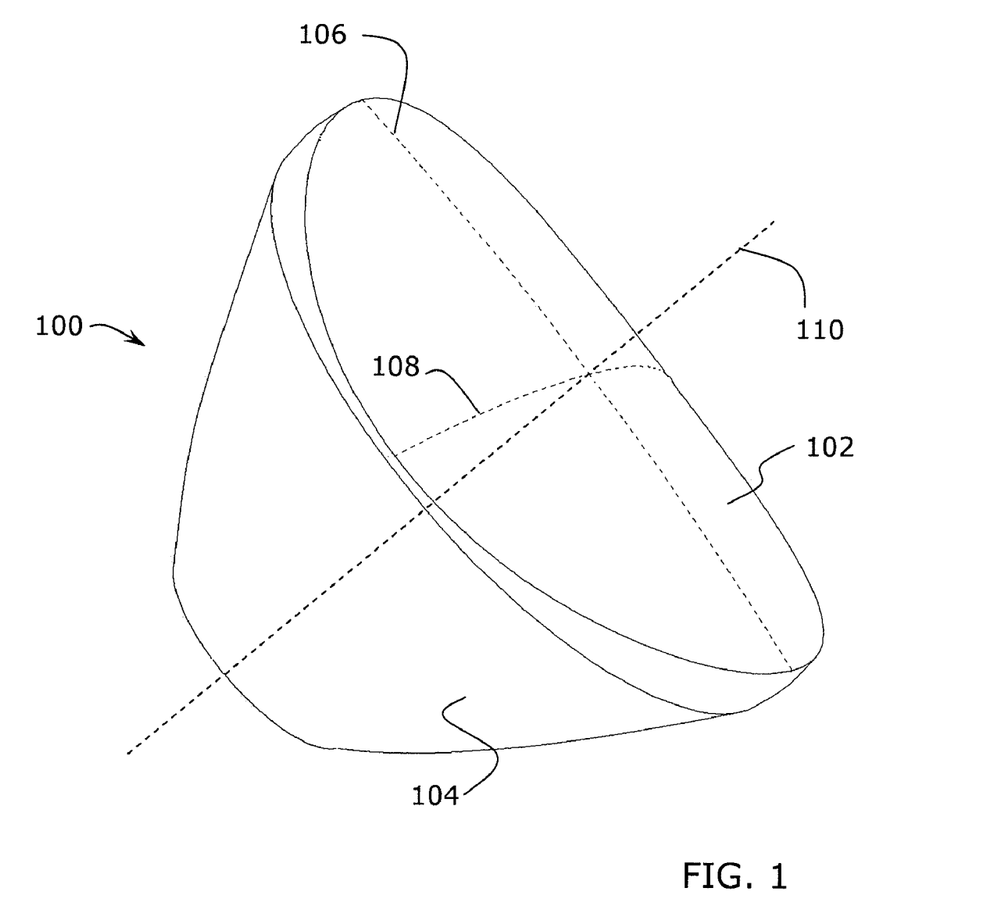
FIG. 1 is a perspective view of a light shaping lens, in accordance with one embodiment of the present invention.

Referring now to the figures, FIG. 1 is a perspective view of a light shaping lens 100 (also referred to as "the lens"), in accordance with one embodiment of the present invention, is shown. The light shaping lens 100 includes an output surface 102, the output surface 102 being the configured to emit a beam of light from the lens, and an outer surface 104, also referred to as the reflective surface, for reflecting light such that they are emitted from the output surface 102. In one embodiment, the outer surface 104 is a reflective surface. The shape of the outer surface 104 may be configured such that the outer surface 104 is a total internal reflection surface. In other embodiments, the outer surface 104 may be coated or texture to result in total internal reflection.

The output surface 102 is a refractive surface having two different curvatures. The output surface 102 has a first curvature in a first direction, the first curvature having a first curvature radius 106, and a second curvature in a second direction, the second curvature having a second curvature radius 108. The first curvature and the second curvature are illustrated generally using a dashed lines as they are included for the purpose of illustration and do not indicate physical structure on the surface of the output surface 102. The first curvature radius 106 and the second curvature radius 108 are generally perpendicular or orthogonal to each other. The two different curvatures act upon refracted light to shape the light emitted by the output surface 102 into a beam having a generally oval or ellipse shape. In one embodiment, the first curvature radius 106 is aligned with the x-axis, or a line horizontal relative to a projection surface, and the second curvature radius 108 is aligned with the y-axis, or a line vertical relative to a projection surface. However, it will be appreciated that the axes may be rotated to rotate the shape of the emitted beam of light.

The shape of the lens 100 is generally rotationally symmetric about a longitudinal axis 110 illustrated using dashed lines. It will be appreciated that the output surface 102 of the lens 100 is not rotationally symmetric about the longitudinal axis 110 as the output surface 102 has two different curvatures, as described above. Both the first curvature and the second curvature curve through the longitudinal axis 110, which is illustrated by the intersection of the first curvature radius 106 with the longitudinal axis 110 and the intersection of the second curvature radius 108 with the longitudinal axis 110.

According to one embodiment, the output surface 102 of the lens 100 is free-form and not spherical or aspherical. Accordingly, light emitted from the lens may have greater uniformity. Additionally, the efficiency of the emitted light is enhanced by embodiments of the present invention because more of the light from the LED, or other light source, is bent and directed on the display panel, and the amount of light used to project the display image is increased or maximized.

The lens 100 further includes a light input surface configured to receive light from the light source. According to one embodiment, the light input surface includes a first input surface 120 and a second input surface 122 that are not visible in FIG. 1, but they are illustrated and described with reference to the cross sectional views shown in FIGS. 2 to 5.

Figure 2:
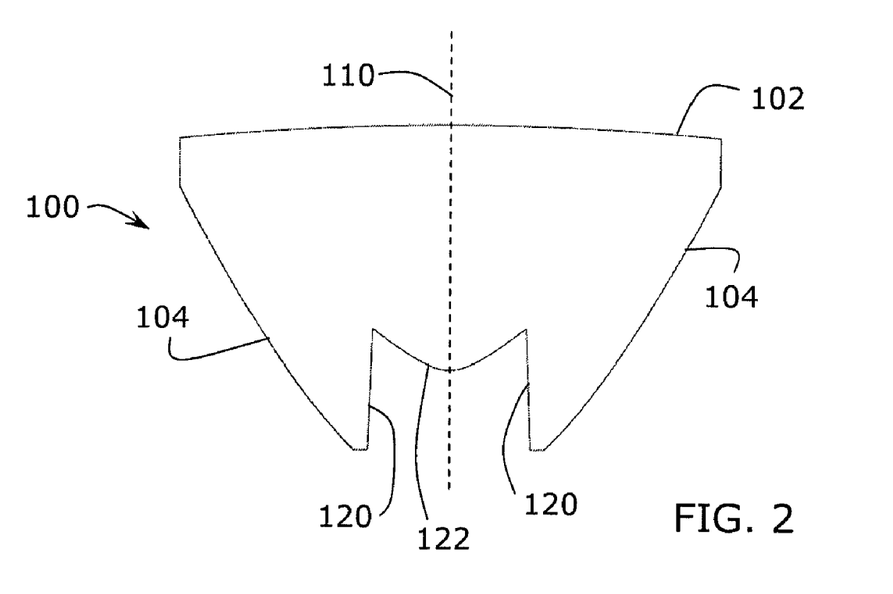
FIG. 2 is a first cross sectional view of the light shaping lens shown in FIG. 1, in accordance with one embodiment of the present invention.
Figure 3:
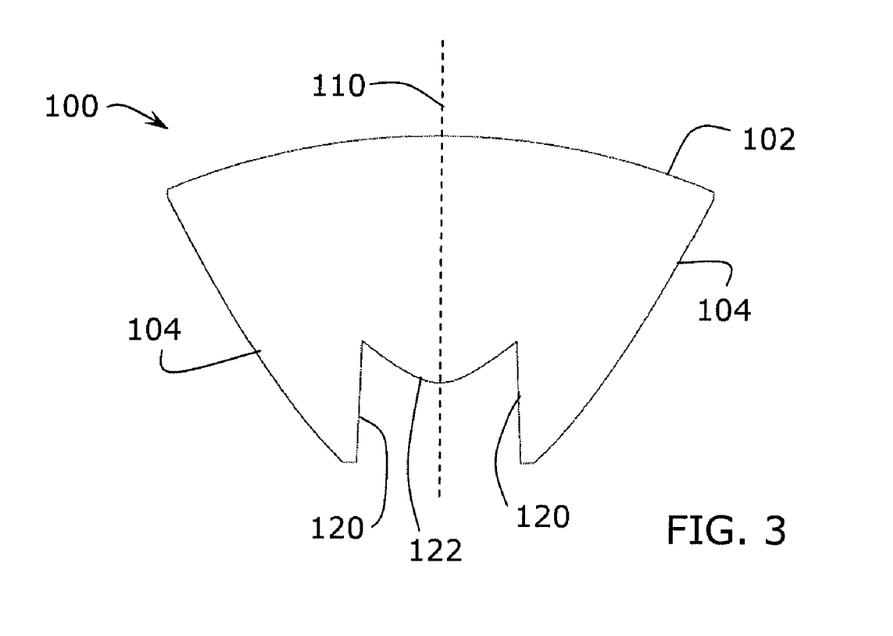
FIG. 3 is a second cross sectional view of the light shaping lens shown in FIG. 1, in accordance with one embodiment of the present invention.

FIG. 2 is a first cross sectional view of the light shaping lens 100 shown in FIG. 1 and FIG. 3 is a second cross sectional view of the light shaping lens 100 shown in FIG. 1, in accordance with one embodiment of the present invention. The cross sectional view shown in FIG. 2 is taken along the first curvature radius 106 and the cross sectional view shown in FIG. 3 is taken along the second curvature radius 108. From the illustrated figures, it can be seen that the output surface 102 along the second curvature radius 108, in FIG. 3, has greater curvature than the output surface 102 along the first curvature radius 106, in FIG. 2.

The lens 100 further includes a first input surface 120 and a second input surface 122. The first input surface 120 is a refractive lens surface configured to receive light emitted from an LED or other light source. The first input surface 120 is configured to refract a first part of the light emitted from the light source. While illustrated as two wall-sections in FIGS. 2 and 3, it will be appreciated that the first input surface 120 is a generally cylindrical surface extending inward to the lens 100 from the narrow end of the lens 100. The lens further includes a second input surface 122. The second input surface 122 is a refractive lens surface configured to refract a second part of the light emitted from the light source. The second input surface 122 has a generally conical shape. According to one embodiment, substantially all of the light emitted from the light source is refracted by the first input surface 120 and the second input surface 122. The outer surface 104 is configured to reflect at least part of the light refracted by the first input surface 120 and the second input surface 122. The light is reflected to the output surface 102 of the lens 100. The output surface 102 is configured to refract the light at predetermined angles such that a cross section of the emitted light beam is generally oval or ellipse.

The output surface 102 of the lens 100 is proximate to the outer surface 104 of the lens 100. The outer surface 104 of the lens is proximate to the first input surface 120 of the lens 100, and the first input surface 120 is proximate to the second input surface of the lens 100. Accordingly to one embodiment, each of the plurality of lens surfaces may be generally contiguous with its proximate surface.

Figure 4:
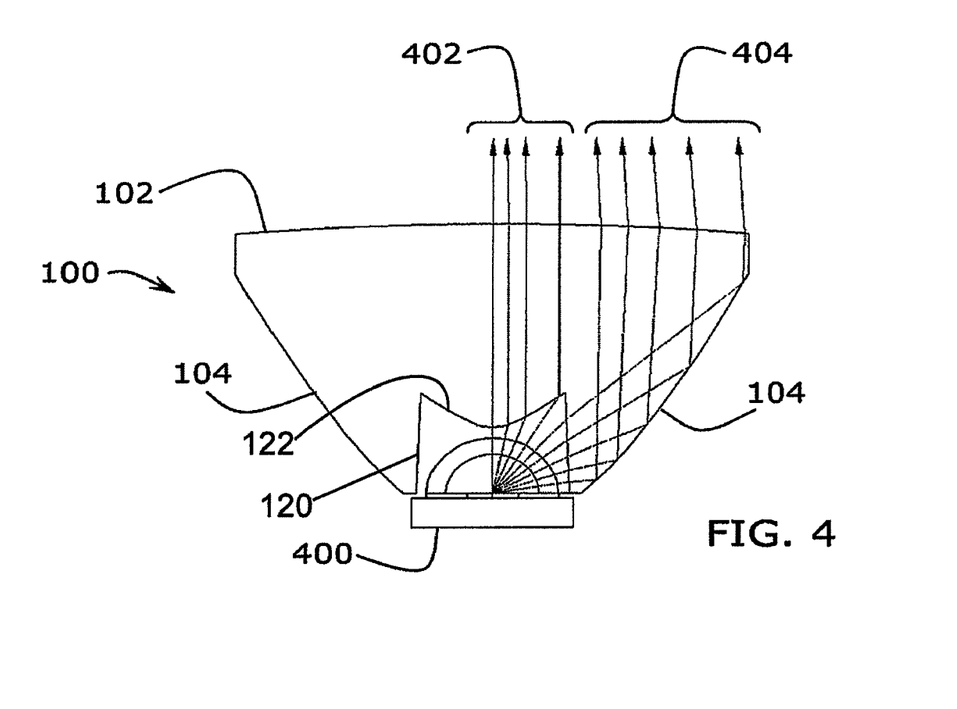
FIG. 4 is the first cross sectional view of the light shaping lens shown in FIG. 2, showing light ray paths, in accordance with one embodiment of the present invention.
Figure 5:
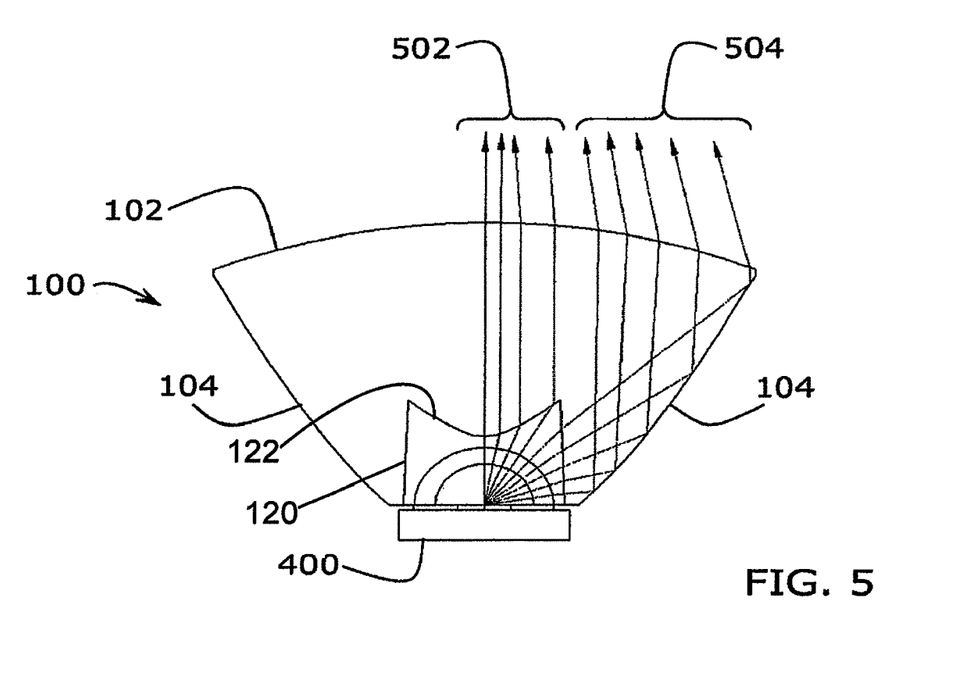
FIG. 5 is the second cross sectional view of the light shaping lens shown in FIG. 3, showing light ray paths, in accordance with one embodiment of the present invention.

FIG. 4 is the first cross sectional view of the light shaping lens shown in FIG. 1, showing light rays, and FIG. 5 is the second cross sectional view of the light shaping lens shown in FIG. 1, showing light ray paths, in accordance with one embodiment of the present invention. FIGS. 4 and 5 are generally similar to FIGS. 2 and 3 with the addition of arrow-ended lines illustrating the reflection and refraction of light emitted from a light source 400. Referring to FIG. 4, a first plurality of light rays 402 are shown being refracted generally directly from the output surface 102 of the lens 100, and a second plurality of light rays 404 are refracted from the output surface 102 of the lens 100 at a slight inward angle. Referring to FIG. 5, a third plurality of light rays 502 are shown being refracted from the output surface 102 of the lens 100, and a fourth plurality of light rays 504 are refracted from the output surface 102 of the lens 100 at an increased inward angle, where the inward angle of the fourth plurality of light rays 504 is smaller than the inward angle of the second plurality of light rays 404. Accordingly, the difference in inward angle between the second plurality of light rays 404 and the fourth plurality of light rays produces an oval or elliptical shaped light beam to be emitted from the output surface 102 of the lens. It will be appreciated that some of the first plurality of light rays 402 are co-linear with some of the third plurality of light rays 502.

Figure 6:
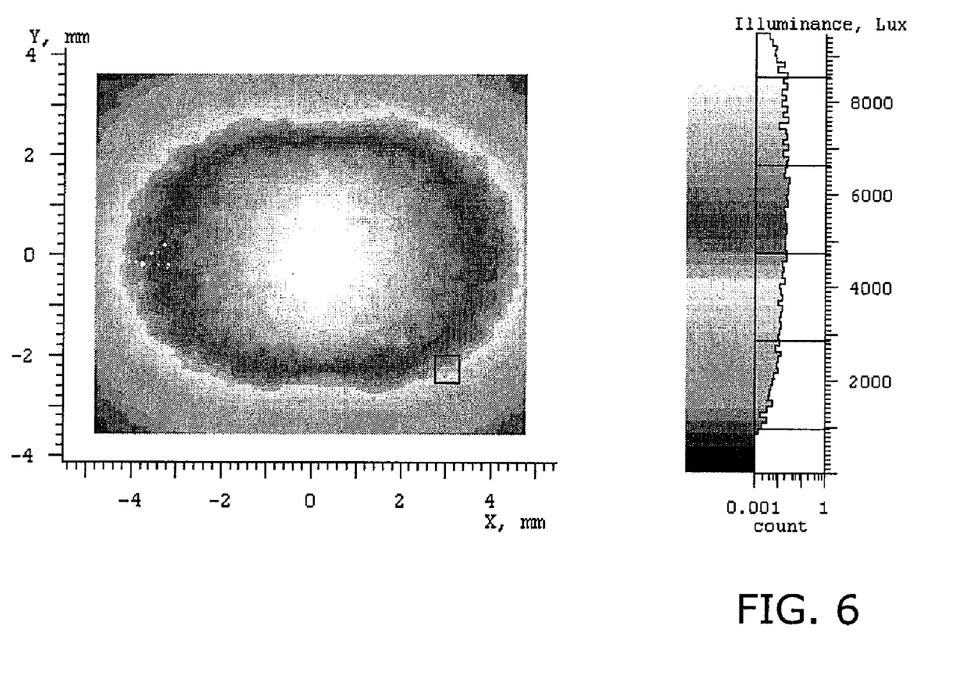
FIG. 6 is an intensity plot of illumination resulting from the light shaping lens shown in FIG. 1, in accordance with one embodiment of the present invention.

FIG. 6 is an intensity plot of illumination resulting from the light shaping lens shown in FIG. 1, in accordance with one embodiment of the present invention. The figure is the intensity plot of an RGB LED shown in grayscale. As illustrated, the intensity plot shows uniformity across an oval cross section, the light having a greater dimension in the x-axis than in the y-axis.

FIGS. 7 to 11 are a plurality of embodiments of projection and illumination systems using the light shaping lens 100 described with reference to FIGS. 1 to 5. The illustrated embodiments show an illumination and projection system. It will be appreciated that these are example embodiments using the lens 100 and that other applications and implementations using these and other display panels may be used.

Figure 7:
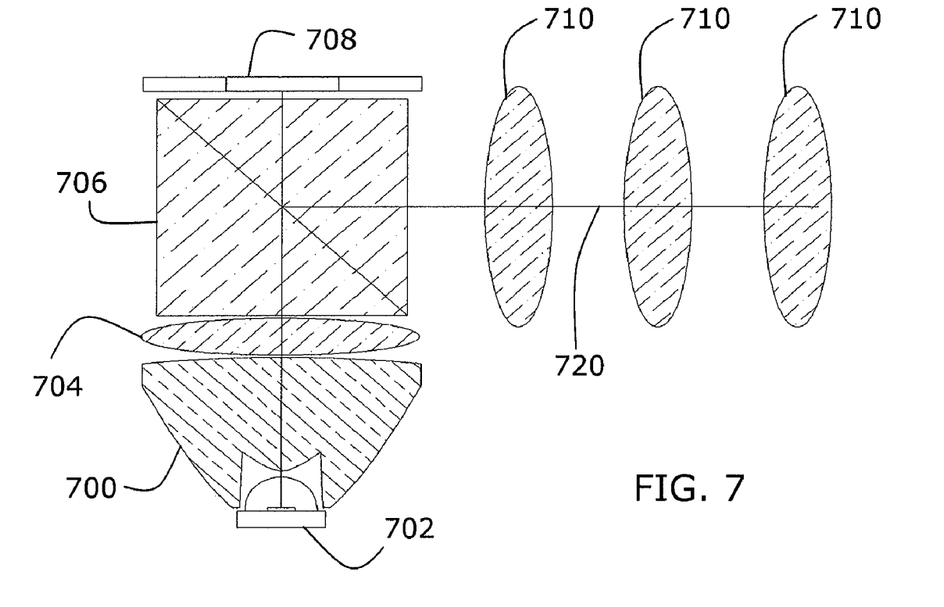
FIG. 7 is a schematic illustration of a first projection system using an LCoS display panel, in accordance with one embodiment of the present invention.

FIG. 7 is a schematic illustration of a first projection system using an LCoS display panel, in accordance with one embodiment of the present invention. The projection system includes a light shaping lens 700, a light source 702, a condenser lens 704, a polarization beam splitter cube 706, an LCoS panel 708, and a plurality of projection lenses 710. In the embodiments illustrated in FIGS. 7 to 11, the projection system comprises the illumination system together with the projection lenses. According to one embodiment, the illumination system comprises the light shaping lens 700, the light source 702, and the LCoS panel 708. A light ray line 720 generally illustrates the path of light within the projection system. According to other components of the projection system.

The illumination systems may also include a control module operably connected to the LCoS panel 708, or other type of display panel, the control module configured to process image data and form a modulated image on the display panel. The projection lenses 710 are configured to project the modulated image for display, such as on a screen or other surface.

The control module may be operably connected to a system that generates and sends the image data to the control module. For example, image data may come from a computer or from a data storage device, such as a memory card, USB memory, optical disk, CD-ROM, or other storage device. Control modules suitable for use in illumination systems and projection systems are known by those of ordinary skill in the field.

Figure 8:
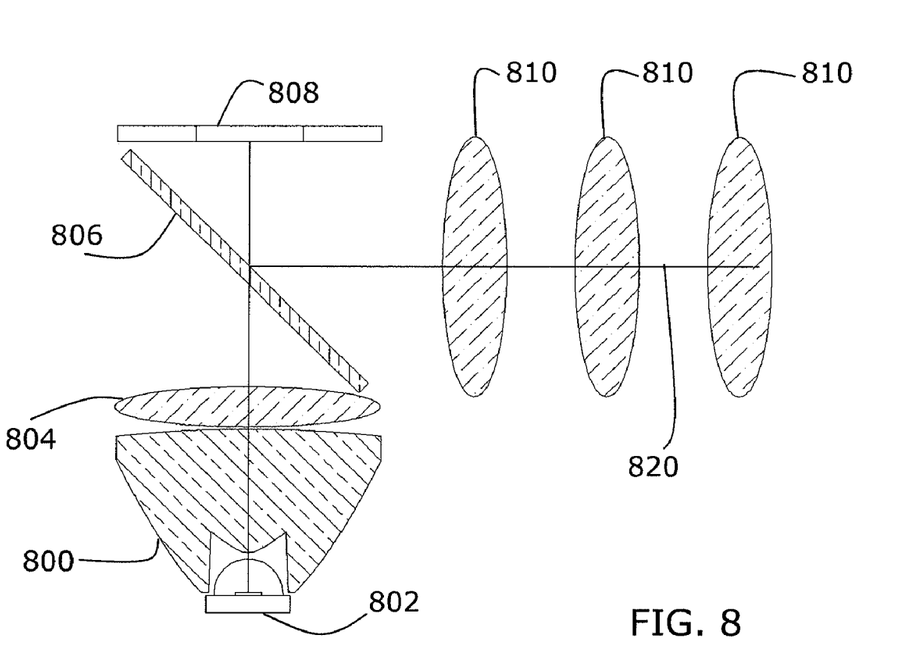
FIG. 8 is a schematic illustration of a second projection system using an LCoS display panel, in accordance with one embodiment of the present invention.

FIG. 8 is a schematic illustration of a second projection system using an LCoS display panel, in accordance with one embodiment of the present invention. The projection system includes a light shaping lens 800, a light source 802, a condenser lens 804, a polarization beam splitter plate 806, an LCoS panel 808, and a plurality of projection lenses 810. A light ray line 820 generally illustrates the path of light within the projection system.

Figure 9:
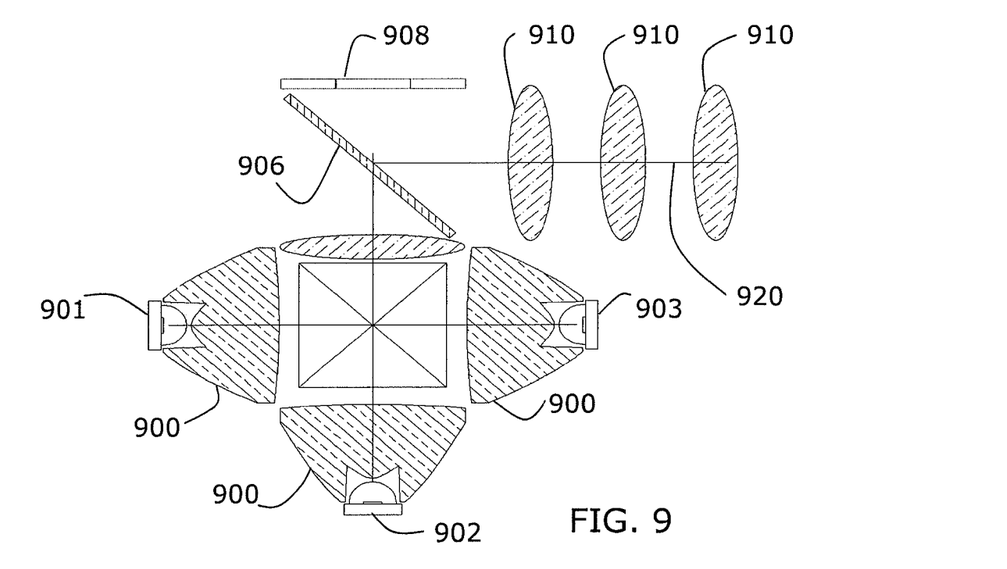
FIG. 9 is a schematic illustration of a third projection system using an LCoS display panel and an RGB LED, in accordance with one embodiment of the present invention.

FIG. 9 is a schematic illustration of a third projection system using an LCoS display panel and an RGB LED group, in accordance with one embodiment of the present invention. The projection system includes a plurality of light shaping lenses 900. In the illustrated embodiment, three light shaping lenses 900 are included, one for each of the light sources. The projection system further includes a first light source 901, a second light source 902, and a third light source 903, which are a red LED, a green LED, and a blue LED, respectively, a condenser lens 904, an X cube 905 for combining the light from the first, second, and third light sources, a polarization beam splitter plate 906, an LCoS panel 908, and a plurality of projection lenses 910. A light ray line 920 generally illustrates the path of light within the projection system.

In the embodiments illustrated in FIGS. 7 and 8, the LCoS panel 708, 808 is a color filter LCoS panel, which can use a single LED, such as a white LED. The embodiment illustrated in FIG. 9 may use a field sequential LCoS panel since an RGB LED is used, therefore providing the color. Use of a color filter LCoS panel may be preferred as use of a single LED allows the production of a smaller illumination and projection system.

Figure 10:
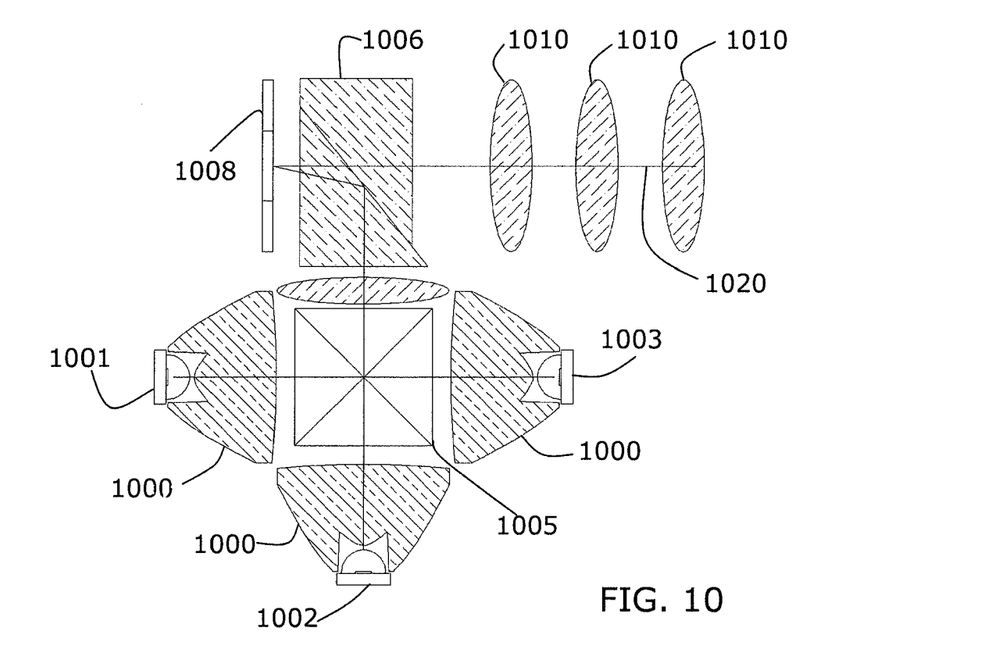
FIG. 10 is a schematic illustration of a projection system using a DMD display panel, in accordance with one embodiment of the present invention.

FIG. 10 is a schematic illustration of a projection system using a DMD display panel, in accordance with one embodiment of the present invention. The projection system includes a plurality of light shaping lenses 1000. In the illustrated embodiment, three light shaping lenses 1000 are included, one for each of the light sources. The projection system further includes a first light source 1001, a second light source 1002, and a third light source 1003, which are a red LED, a green LED, and a blue LED, respectively, a condenser lens 1004, an X cube 1005 for combining the light from the first, second, and third light sources, a total internal reflection (TIR) prism 1006, a DMD panel 1008, and a plurality of projection lenses 1010. A light ray line 1020 generally illustrates the path of light within the projection system.

Figure 11:
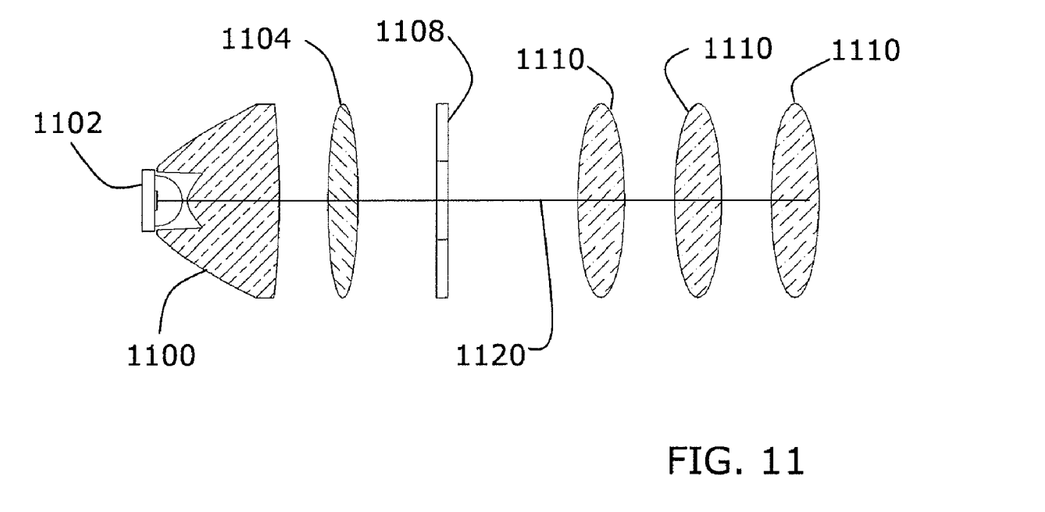
FIG. 11 is a schematic illustration of a projection system using an LCD panel, in accordance with one embodiment of the present invention.

FIG. 11 is a schematic illustration of a projection system using an LCD panel, in accordance with one embodiment of the present invention. The projection system includes a light shaping lens 1100, a light source 1102, a condenser lens 1104, an LCD panel 1108, and a plurality of projection lenses 1110. A light ray line 1120 generally illustrates the path of light within the projection system.

While the invention has been particularly shown and described with reference to the illustrated embodiments, those skilled in the art will understand that changes in form and detail may be made without departing from the spirit and scope of the invention. For example, while example types of projectors, including DMD, LCoS, and LCD, embodiments of the invention are not limited to these types but may be used for other projector types as well. For example, a spatial light modulation device may also be used. Also, while aspects of the invention are well suited for miniature or portable projectors, the embodiments of the invention may also be applied to other projector types. Also, while the lens 100, also known as an LED light collector or light collimator, is configured such that it results in total internal reflection, embodiments of the present invention may also use other shapes and configuration. However, the total internal reflection may result in greater light efficiency.

While one refraction angle is illustrated by the light rays in FIGS. 3 and 4, the desired curvature and bend angle of the light depends on the size of the display panel being used. With a smaller panel, the bend angle may smaller so that the light is focused on a smaller area, and with a larger panel, the bend angle is greater so that the light is focused on a larger area, according to the requirements of the particular application. Accordingly, while certain curvatures and curvature radii are illustrated and described, embodiments of the present invention are not limited to these curvatures. Additionally, while the output surface of the lens is described as having a first curvature and a second curvature, the output surface may include other curvatures and variations as required by the particular application.

Accordingly, the above description is intended to provide example embodiments of the present invention, and the scope of the present invention is not to be limited by the specific examples provided.

What is claimed is:

1. A light shaping lens, the light shaping lens configured to shape light emitted from a light source, the light shaping lens comprising:
    a first refractive lens surface configured to receive a first part of the light emitted from the light source;
    a second refractive lens surface configured to receive a second part of the light emitted from the light source;
    a reflective lens surface configured to reflect at least part of the light received by the second refractive lens surface; and
    a third refractive lens surface configured to emit the light the light received from the first refractive lens surface and the second refractive lens surface and reflected by the reflective lens surface, the third refractive lens surface having a first curvature and a second curvature, and wherein the third refractive lens surface refracts the emitted light in an oval cross section.

2. The light shaping lens of claim 1, wherein the first curvature has a first curvature in a first direction and the second curvature has a second curvature in a second direction, and the first curvature is different from the second curvature.

3. The light shaping lens of claim 1, wherein the reflective lens surface is a total reflection surface.

4. The light shaping lens of claim 1, wherein a first plurality of light rays are refracted along the first curvature at a first inward angle and a second plurality of light rays are refracted along the second curvature at a second inward angle, and wherein the first inward angle is greater than the second inward angle.

5. The light shaping lens of claim 1, further comprising a display panel, and wherein the light source is one or more light emitting diodes (LED), and the display panel is positioned receive the light emitted from the light shaping lens.

6. The light shaping lens of claim 5, wherein the one or more LED is an RGB LED.

7. The light shaping lens of claim 5, wherein the one or more LED is a white LED.

8. The light shaping lens of claim 5, wherein the display panel is a liquid crystal on silicon display panel.

9. The light shaping lens of claim 5, wherein the display panel is a liquid crystal display panel.

10. The light shaping lens of claim 5, wherein the display panel is a digital micro-mirror device.

11. The light shaping lens of claim 5, wherein the display panel is a spatial light modulation device.

12. A light shaping lens, the light shaping lens configured to shape light emitted from a light source, the light shaping lens comprising:
    a first refractive lens surface configured to receive a first part of the light emitted from the light source;
    a second refractive lens surface configured to receive a second part of the light emitted from the light source;
    a reflective lens surface configured to reflect at least part of light received by the first refractive lens surface and the second refractive lens surface; and
    a third refractive lens surface configured to emit the light the light received from the first refractive lens surface and the second refractive lens surface and reflected by the reflective lens surface, the third refractive lens surface having a first curvature and a second curvature, and wherein the third refractive lens surface refracts the emitted light in an oval cross section.

13. The light shaping lens of claim 12, wherein the light output surface is free-form.

14. The light shaping lens of claim 12, wherein the first curvature is generally perpendicular to the second curvature.

15. The light shaping lens of claim 12, wherein the first curvature has a first curvature and the second curvature has a second curvature, and the first curvature is different from the second curvature.

16. The light shaping lens of claim 12, wherein the reflective lens surface is a total internal reflection surface.

17. The light shaping lens of claim 12, further comprising a display panel, and wherein the light source is one or more light emitting diodes (LED), and the display panel is positioned receive the light emitted from the light shaping lens.

18. The light shaping lens of claim 17, wherein the one or more LED is a RGB LED.

19. The light shaping lens of claim 17, wherein the one or more LED is a white LED.

20. The light shaping lens of claim 17, wherein the display panel is a liquid crystal on silicon display panel.

21. The light shaping lens of claim 17, wherein the display panel is a liquid crystal display panel.

22. The light shaping lens of claim 17, wherein the display panel is a digital micro-mirror device.

23. The light shaping lens of claim 17, wherein the display panel is a spatial light modulation device.

24. An illumination system, comprising:
    a light source configured to emit light;
    a display panel;
    a light shaping lens, the light shaping lens configured to shape light emitted from the light source, the light shaping lens comprising:
        a first refractive lens surface configured to receive a first part of the light emitted from the light source;
        a second refractive lens surface configured to receive a second part of the light emitted from the light source;
        a reflective lens surface configured to reflect at least part of light received by the second refractive lens surface; and
        a third refractive lens surface configured to emit the light the light received from the first refractive lens surface and the second refractive lens surface and reflected by the reflective lens surface, the third refractive lens surface having a first curvature and a second curvature, and wherein the third refractive lens surface refracts the emitted light in an oval cross section, and wherein the light shaping lens is positioned to direct the light emitted from the output surface on the display panel.

25. A projection system, comprising:

a light source configured to emit light;

a display panel;

a light shaping lens, the light shaping lens configured to shape light emitted from the light source, the light shaping lens comprising:

a first refractive lens surface configured to receive a first part of the light emitted from the light source;

a second refractive lens surface configured to receive a second part of the light emitted from the light source;

a reflective lens surface configured to reflect at least part of light received by the second refractive lens surface; and a third refractive lens surface configured to emit the light the light received from the first refractive lens surface and the second refractive lens surface and reflected by the reflective lens surface, the third refractive lens surface having a first curvature and a second curvature, and wherein the third refractive lens surface refracts the emitted light in an oval cross section, and wherein the light shaping lens is positioned to direct the emitted light on the display panel; and a projection lens group that receives the light emitted from the output surface, modulated by display panel, the projection lens group configured to project the modulated image.

\* \* \* \* \*